United States Patent [19]
Bosh

[11] Patent Number: 5,234,248
[45] Date of Patent: Aug. 10, 1993

[54] VEHICULAR REAR WINDOW AIR DEFLECTOR APPARATUS

[76] Inventor: Robert L. Bosh, 2155 S. Bellaire St., Denver, Colo. 80222

[21] Appl. No.: 910,515

[22] Filed: Jul. 8, 1992

[51] Int. Cl.⁵ .............................................. B62D 35/00
[52] U.S. Cl. ...................................................... 296/91
[58] Field of Search ..................... 296/91, 95.1, 180.3

[56] References Cited

U.S. PATENT DOCUMENTS

| | | | |
|---|---|---|---|
| 1,360,919 | 11/1920 | Garside | 296/95.1 |
| 3,072,431 | 1/1963 | Shumaker | 296/91 |
| 3,089,728 | 5/1963 | Shumaker | 296/91 |
| 4,881,772 | 11/1989 | Feinberg | 296/180.1 |

*Primary Examiner*—Robert R. Song
*Attorney, Agent, or Firm*—Leon Gilden

[57] ABSTRACT

A deflector structure is arranged for mounting to a vertical rear panel of an associated vehicle, having rear panel windows directed therethrough. The air deflector structure is arranged for mounting above and below the windows, wherein each deflector member includes a first plate mounted to the rear panel, and a second plate hingedly mounted for pivotal movement to the first plate. Mounting is effected by mechanical fasteners, or alternatively mechanical fasteners in combination with magnetic mounting plates.

3 Claims, 4 Drawing Sheets

VEHICULAR REAR WINDOW AIR DEFLECTOR APPARATUS

BACKGROUND OF THE INVENTION

1. Field of the Invention

The field of invention relates to deflector apparatus, and more particularly pertains to a new and improved vehicular rear window air deflector apparatus arranged to deflect air and associated debris relative to and past a rear window of an associated vehicle.

2. Description of the Prior Art

Air deflector apparatus is utilized in the prior art and exemplified by patents to include U.S. Pat. No. 4,878,707 to Meyers mounting an air deflector structure relative to a rear window of a vehicle in the configuration of an oblong panel positioned smoothly about a corner of the associated vehicle.

U.S. Pat. No. 4,934,754 to Cioffi sets forth a wind deflector mounted to a roof portion of the associated vehicle.

U.S. Pat. No. 4,844,529 to O'Saven sets forth a wind deflector arranged relative to a window to divert air therefrom for comfort of a driver positioned within the vehicle.

As such, it may be appreciated there continues to be a need for a new and improved vehicular rear window air deflector apparatus as set forth by the instant invention which addresses both the problems of ease of use as well as effectiveness in construction by providing for an adjustable deflector structure arranged relative to a rear window of a vehicle and above and below said rear window and in this respect, the present invention substantially fulfills this need.

SUMMARY OF THE INVENTION

In view of the foregoing disadvantages inherent in the known types of wind deflector apparatus now present in the prior art, the present invention provides a vehicular rear window air deflector apparatus having adjustable vanes positioned above and below an associated window to deflect air therefrom and associated debris directed by such air. As such, the general purpose of the present invention, which will be described subsequently in greater detail, is to provide a new and improved vehicular rear window air deflector apparatus which has all the advantages of the prior art wind deflector apparatus and none of the disadvantages.

To attain this, the present invention provides a deflector structure arranged for mounting to a vertical rear panel of an associated vehicle, having rear panel windows directed therethrough. The air deflector structure is arranged for mounting above and below the windows, wherein each deflector member includes a first plate mounted to the rear panel, and a second plate hingedly mounted for pivotal movement to the first plate. Mounting is effected by mechanical fasteners, or alternatively mechanical fasteners in combination with magnetic mounting plates.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular rear window air deflector apparatus which has all the advantages of the prior art () and none of the disadvantages.

It is another object of the present invention to provide a new and improved vehicular rear window air deflector apparatus which may be easily and efficiently manufactured and marketed.

It is a further object of the present invention to provide a new and improved vehicular rear window air deflector apparatus which is of a durable and reliable construction.

An even further object of the present invention is to provide a new and improved vehicular rear window air deflector apparatus which is susceptible of a low cost of manufacture with regard to both materials and labor, and which accordingly is then susceptible of low prices of sale to the consuming public, thereby making such vehicular rear window air deflector apparatus economically available to the buying public.

Still yet another object of the present invention is to provide a new and improved vehicular rear window air deflector apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
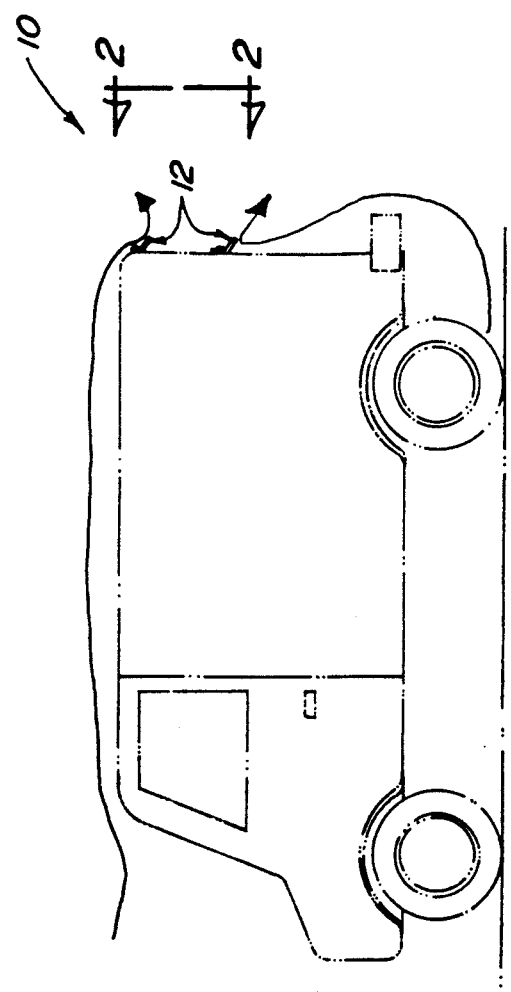
FIG. 1 is an orthographic side view of the invention positioned relative to a vehicle.
Figure 2:
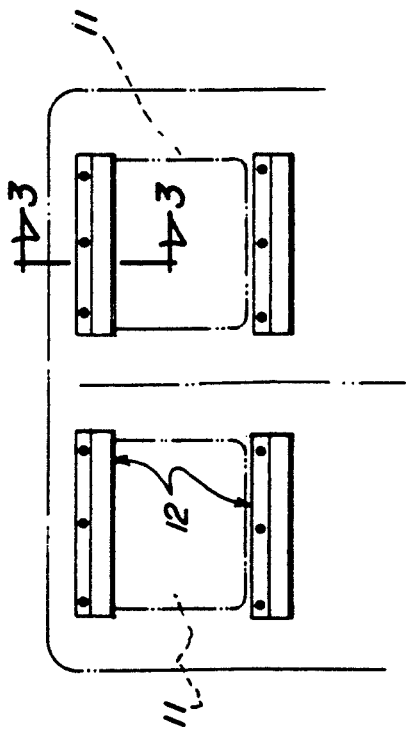
FIG. 2 is an orthographic view, taken along the lines 2—2 of FIG. 1 in the direction indicated by the arrows.
Figure 3:
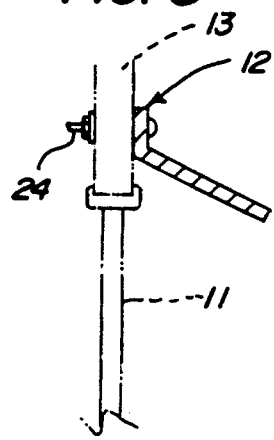
FIG. 3 is an orthographic view, taken along the lines 3—3 of FIG. 2 in the direction indicated by the arrows.
Figure 4:
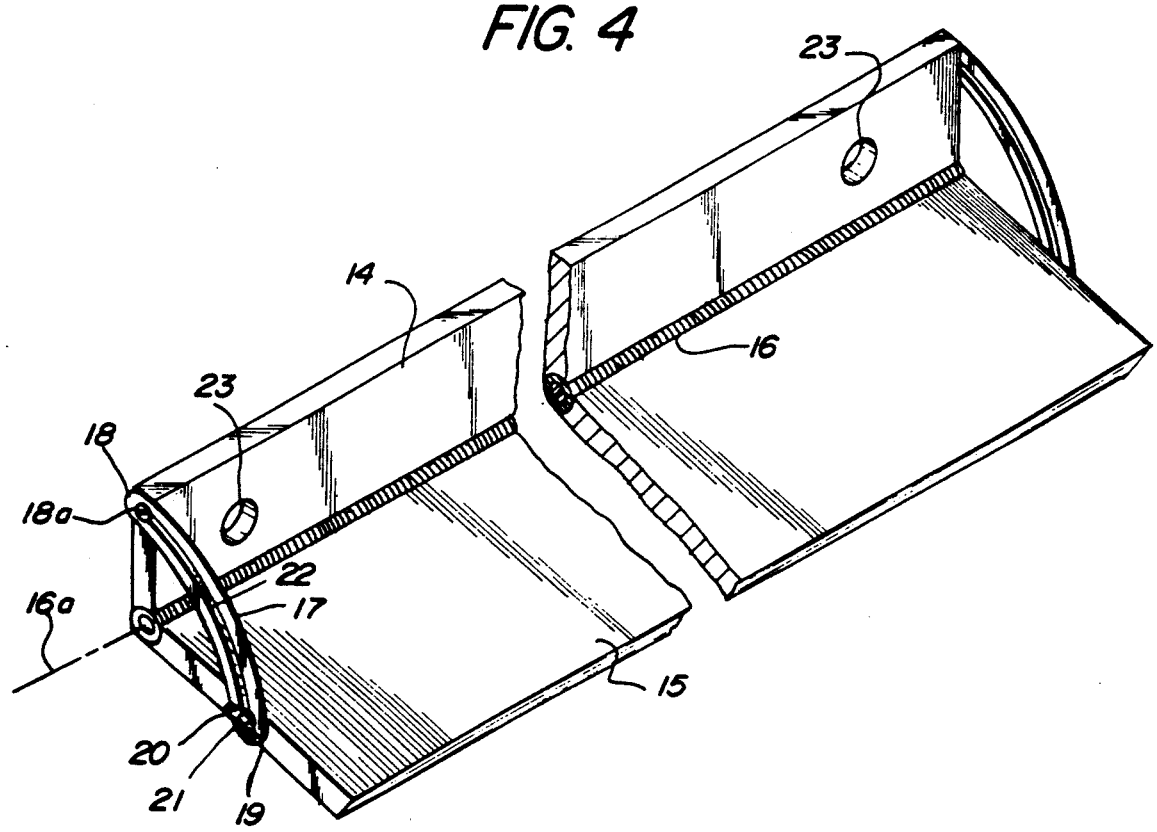
FIG. 4 is an isometric illustration of one of said air deflector members utilized by the invention.

With reference now to the drawings, and in particular to FIGS. 1 to 9 thereof, a new and improved vehicular rear window air deflector apparatus embodying the principles and concepts of the present invention and generally designated by the reference numeral 10 will be described.

More specifically, the vehicular rear window air deflector apparatus 10 of the instant invention essentially comprises a plurality of air deflector assemblies 12, with one of said assembly positioned above an associated vehicular rear window 11 and a further one of said air deflector air assemblies 12 positioned below the rear window 11. The windows are mounted to a vehicular rear door panel 13 as illustrated and configured in van type vehicles.

Each air deflector assembly 12 includes a first plate 14 arranged for securement to the vehicular rear door panel 13, and a second plate 15 hingedly mounted to the first plate 14 about a hinge 16 coextensive about an intersection of the first and second plates 14 and 15. An arcuate bracket 17 fixedly mounted to the first plate 14 has a bracket first end 18, including a first end fastener 18a directed through an arcuate slot 22 of the arcuate bracket 17. The slot 22 is fully enclosed within the arcuate bracket 17, with the first end fastener 18a directed through the slot 22 received within a side wall of the first plate 14. The arcuate bracket 17 includes a bracket second end 19 slidably receiving a fastener rod 21 that is secured through a side wall of the second plate 15 utilizing a fastener member 20 in operative association with the fastener rod 21 to secure the arcuate bracket 17, and more specifically the rotative displacement of the second plate 15 relative to the arcuate bracket 17 in a fixed orientation. Loosening of the fastener member 20 permits pivotment of the second plate relative to the first plate, whereupon directing the fastener member 20 to the fastening rod 21 captures the arcuate bracket 17 between the fastener member 20 and the second plate 15. It should be further noted the first plate includes first plate apertures 23 to receive first plate fasteners 24 through the first plate apertures 23 in securement of the first plate 14 to the rear door panel 13.

Figure 5:
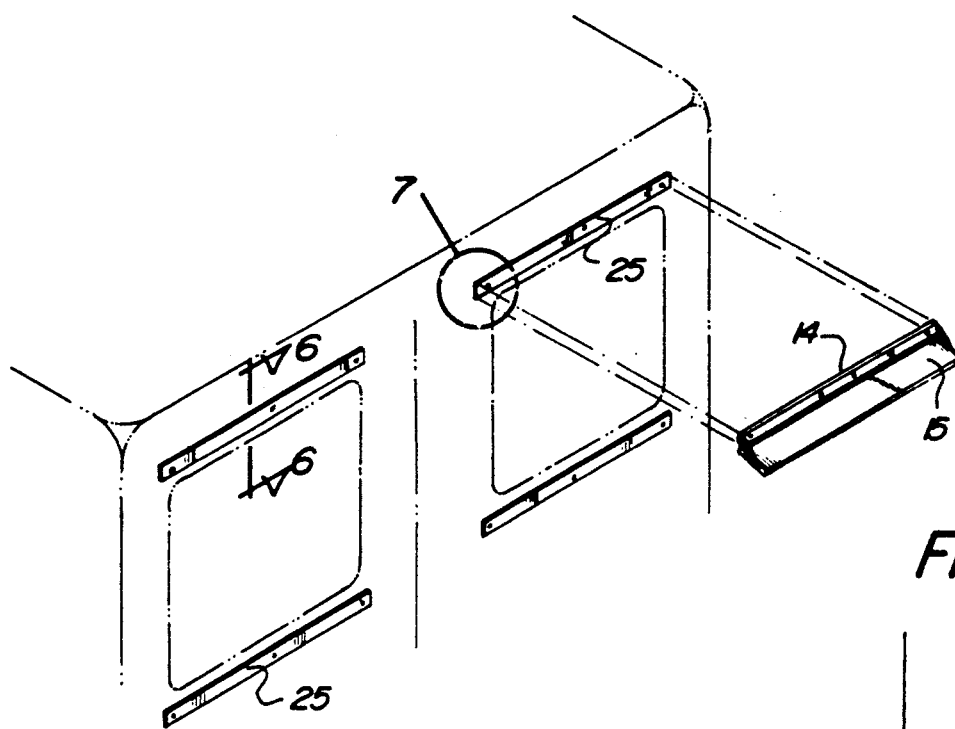
FIG. 5 is an isometric illustration of the invention utilizing magnetic fastener strips.
Figure 6:
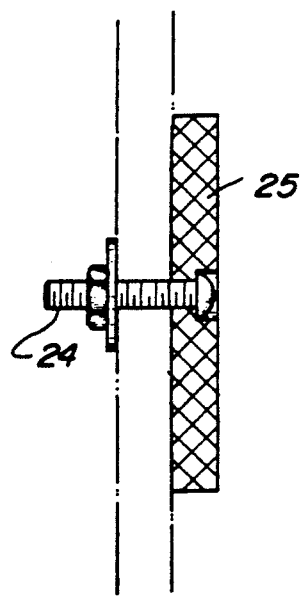
FIG. 6 is an orthographic view, taken along the lines 6—6 of FIG. 5 in the direction indicated by the arrows.
Figure 7:
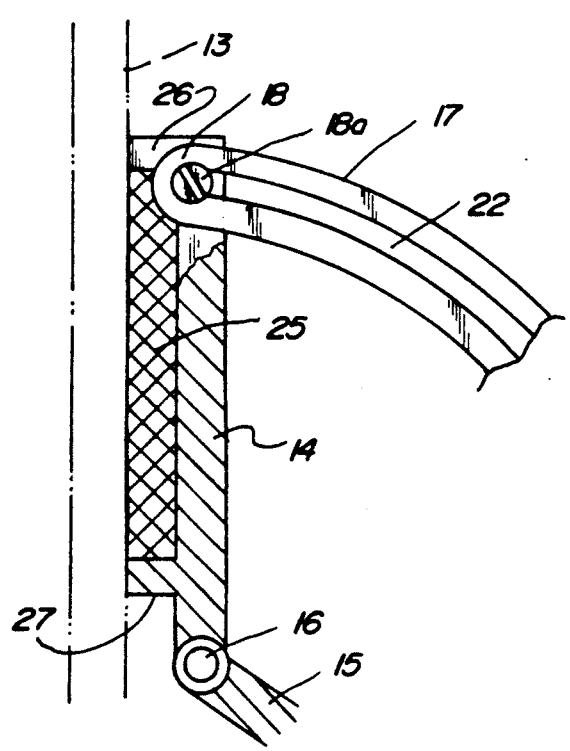
FIG. 7 is an enlarged isometric illustration of section 7 as set forth in FIG. 5.

The FIGS. 5 and 6 indicate the use of ferromagnetic plates 25 utilizing the fastener structure 24 to secure the magnetic plates 25 to the door panel 13, with the ferromagnetic plates 25 positioned above and below the door panel. The first plate includes a first plate first flange and a first plate second flange 26 and 27 respectively positioned in a parallel relationship relative to one another in a spaced relationship projecting rearwardly and orthogonally relative to a rear wall of the first plate 14 to receive the ferromagnetic plate 25 therebetween for rapidity of securement of the first plate relative to the rear door panel 13 above and below an associated window, as indicated in FIG. 5.

Figure 8:
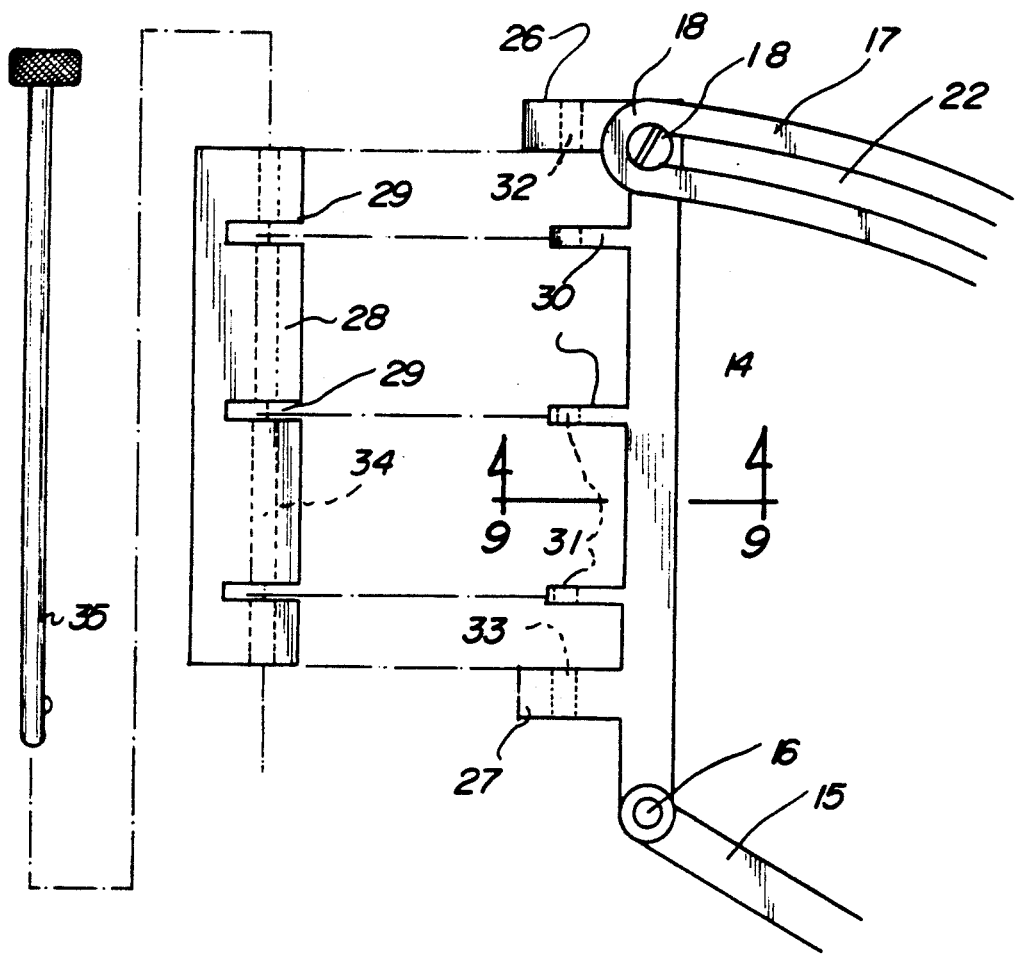
FIG. 8 is an orthographic side view of a further mounting structure utilized by the invention.
Figure 9:
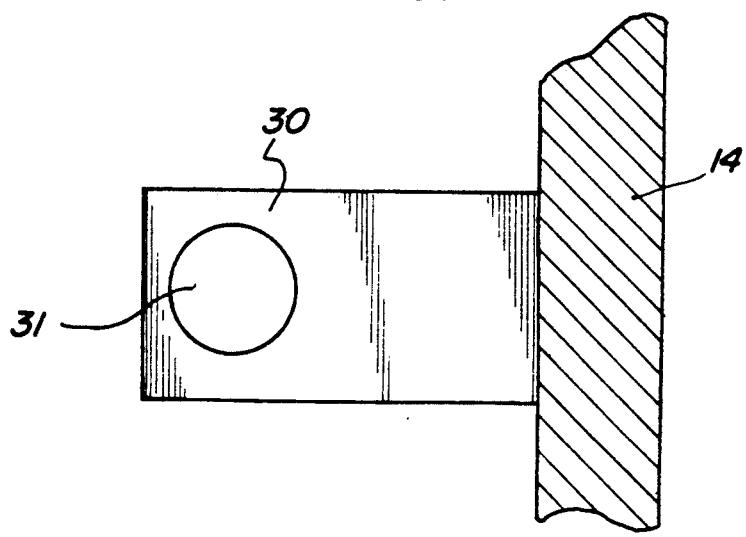
FIG. 9 is an orthographic view, taken along the lines 9—9 of FIG. 8 in the direction indicated by the arrows.

The FIGS. 8 and 9 indicate the use of a modified magnetic plate 28 having parallel slots 29 spaced apart a predetermined spacing. Parallel ribs 30 project rearwardly and orthogonally in a parallel relationship between the first and second flanges 26 and 27 of the first plate, with the ribs 30 having rib apertures 31 that are coaxially aligned, with a first flange aperture 32 directed through the first flange, and a second flange aperture 33 directed through the second flange. A plate bore 34 directed through the modified magnetic plate 28 and through the ribs 30 receives a lock pin 35 upon reception of the ribs 30 within parallel slots 29 of the magnetic plate 28 that are spaced apart the predetermined spacing. In this manner should an individual require more permanent association of the deflector assemblies, the pin structure may be utilized in association with the magnetic plate members 28 as indicated.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A vehicular rear window air deflector apparatus arranged for mounting relative to a rear window member, with the rear window member mounted to a rear door panel of an associated vehicle, the rear window including an upper end spaced from a lower end, the apparatus arranged for selective securement adjacent the upper end and the lower end, wherein the apparatus comprises, a first plate, and a second plate, and a hinge member, with the first plate arranged coextensively of the second plate, and the hinge arranged coextensively in and intermediate the first plate and the second plate to pivotally mount the first plate to the second plate, and an arcuate bracket, the arcuate bracket including a bracket first end and a bracket second end, the bracket first end including a first end fastener directed through the first end into the first plate, and an arcuate slot directed through the arcuate bracket, with the arcuate slot radially oriented about the hinge, and fastener means directed through the arcuate slot into the second plate for selective displacement of the second plate relative to the arcuate bracket.

2. An apparatus as set forth in claim 1 including a ferromagnetic plate arranged for securement to the rear door panel, with the first plate including a first flange and a second flange projecting rearwardly and orthogonally relative to the first plate in a spaced relationship receiving the ferromagnetic plate therebetween.

3. An apparatus as set forth in claim 2 wherein the first plate includes a plurality of parallel ribs intermediate the first flange and the second flange, and the first flange includes a first flange aperture, the second flange includes a second flange aperture, and the ribs each include a rib aperture, wherein each of the rib apertures, the first flange aperture, and the second flange aperture are coaxially aligned, and the magnetic plate includes a plurality of parallel slots, wherein the parallel slots are spaced apart a predetermined spacing and the ribs are spaced apart said predetermined spacing, with the slots arranged for receiving the ribs, and a plate bore directed through the magnetic plate and the slots, with a lock pin arranged for projection through the plate bore when the ribs are directed into the slots.

* * * * *